BYTE DECODER

Filed April 29, 1963 2 Sheets-Sheet 1

INVENTOR
WILLIAM R. LAMOUREUX
BY Joseph J. Connerton
ATTORNEY

Dec. 6, 1966

W. R. LAMOUREUX 3,290,671

BYTE DECODER

Filed April 29, 1963

2 Sheets-Sheet 2

United States Patent Office 3,290,671

Patented Dec. 6, 1966

3,290,671

BYTE DECODER

William R. Lamoureux, Kingston, N.Y., assignor to International Business Machines Corporation, New York, N.Y., a corporation of New York Filed Apr. 29, 1963, Ser. No. 276,569
9 Claims. (Cl. 340—347)

The subject invention relates to a decoder and more particularly to a digital to analog decoder.

In known digital to analog converters or decoders, it has been customary to employ ladder attenuation networks in which the digital inputs are applied to the individual legs of the ladder comprising a group of parallel resistors of binary weighted magnitude. The resistances are weighted in an inverse order of significance, i.e., the least significant digit or bit would see the highest resistance while the most significant bit would see the lowest resistance such that the analog current output from the individual legs of the ladder is binary weighted. A variation of the conventional ladder network is a decoder in which a single shunt resistor is interconnected in the ladder configuration to provide a common attenuation for the less significant portion of the digital word. However, in both cases, the binary weighted current in the decoder rises as a power of 2 such that the current required from the most significant bit in a 12-bit word; for example, is 2,048 times more significant than the current required from the least significant bit. This problem increases in complexity with the number of bits in a binary word such that if the current from the most significant bit must be held to a nominal value, the current required from the lowest order or least significant bit would be less than the normal leakage current of the supply; if the current for the least significant bit is at some significant level, the current from the most significant bit would rise to an impractical level for most applications. These and other limitations of the prior art are overcome by the present invention which treats words on a byte basis using an individual decoding network for each byte and then combines the output from the individual networks. After selecting an appropriate byte size, the digital word is divided into bytes and depending on whether single- or double-ended decoding is used, i.e., whether one or both binary digits are significant, the appropriate digital input of each byte is decoded to provide one or two analog outputs indicative of the binary value of the byte. The potential value of each digit or bit is the same so that a significant current is available for each bit. After decoding, the individual bytes will be weighted in accordance with their relative position in the word and then added to provide the analog representation of the entire word. While not necessary to the invention, a further refinement included in the invention permits generation of the analog representation irrespective of variations in the load.

Accordingly, a primary object of the present invention is to provide an improved digitial to analog decoder.

Another object of the present invention is to provide an improved digital to analog converter adapted to decode digital words on a byte basis.

Still another object of the present invention is to provide an improved digital to analog decoder utilizing a plurality of decoding networks.

A further object of the present invention is to provide an improved digital to analog converter in which a constant analog representation of the digital input is provided irrespective of a wide variation of load impedance.

The foregoing and other objects, features and advantages of the invention will be apparent from the following more particular description of a preferred embodiment of the invention, as illustrated in the accompanying drawings.

Figure 1:
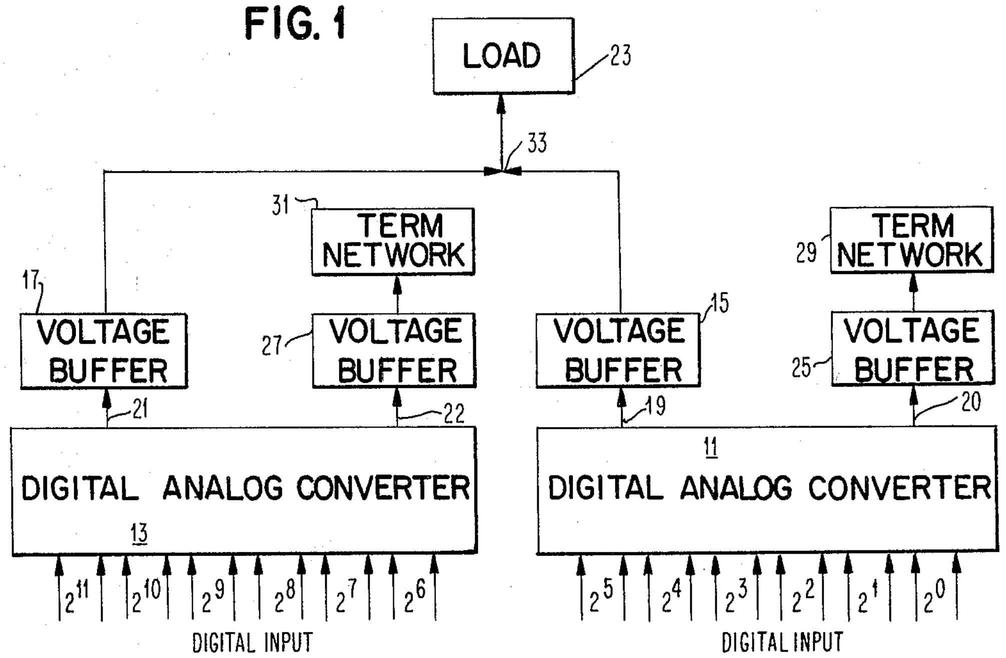
FIGURE 1 illustrates in block form a preferred embodiment of the subject invention.

Before referring to the drawings, the subject invention will be described in terms of a twelve-bit binary word consisting of two six-bit bytes. However, as will become apparent, the subject invention is applicable to digital words of varying size, although the benefits derived from the invention will generally vary directly in accordance with the number of digits or bits in the word. Likewise, while the subject invention will be described in terms of six-bit bytes, it is obvious that the bytes can be of greater or lesser size and the number of bytes is merely a function of the word size.

Referring now to FIGURE 1, the subject invention is illustrated in block form. The digital inputs $2^0$ through $2^5$ comprising the less significant byte are applied to digital analog decoder or converter 11, while the more significant byte comprising digits $2^6$ through $2^{11}$ is applied to digital analog decoder 13. The preferred embodiment herein described is a balanced decoding network in which either the one or zero binary input may be significant. As more fully described hereinafter, digital to analog converters 11 and 13 are identical in construction and current capacity, the individual circuit associated with each leg within the converter corresponding to the associated leg within the other converter. For example, the $2^0$ circuit corresponds to the $2^1$ circuit, the $2^7$ circuit and so forth. As shown and more fully described hereinafter, the digital to analog decoders 11 and 13 convert the digital input to a binary weighted current. In the specific environment in which the subject invention was employed, it was necessary to provide a constant current representative of the digital input despite a fluctuating load. Accordingly, voltage buffers 15 and 17 are interposed between decoder outputs 19 and 21 and load 23 to isolate load fluctuations from the decoding circuitry.

In an N bit decoder, the high order half of the decoder is $2^{N/2}$ times a significant as the low order half. For example, in a twelve-bit decoder herein described as illustrative of the subject invention, the output from the higher order byte decoder is sixty-four times more significant than the output from the lower order byte decoder. Accordingly, voltage buffer 12 performs the additional function of dividing the output from digital to analog converter 11 by a factor of sixty-four. Since both the one and zero representations are used for each digital input in the preferred embodiment, the decoding circuitry effectively functions in a push-pull or double ended mode. The decoder outputs representative of the zero digital inputs on lines 20, 22 are buffered through voltage buffers 25, 27 before being applied to terminating networks 29, 31 respectively. This balanced arrangement is necessary to prevent any load variations from either output reflecting back and thus modifying the output of the individual decoders. However, it should be understood that the present invention is equally applicable to a single-sided decoding network in which only the binary one digital inputs are applied to the decoders. Functioning as above-described, the output from the voltage buffer 17, representing the more significant byte, is combined with the output from voltage buffer 15 representing the less significant byte at summing node 33 before being applied to load 23.

Figure 2:
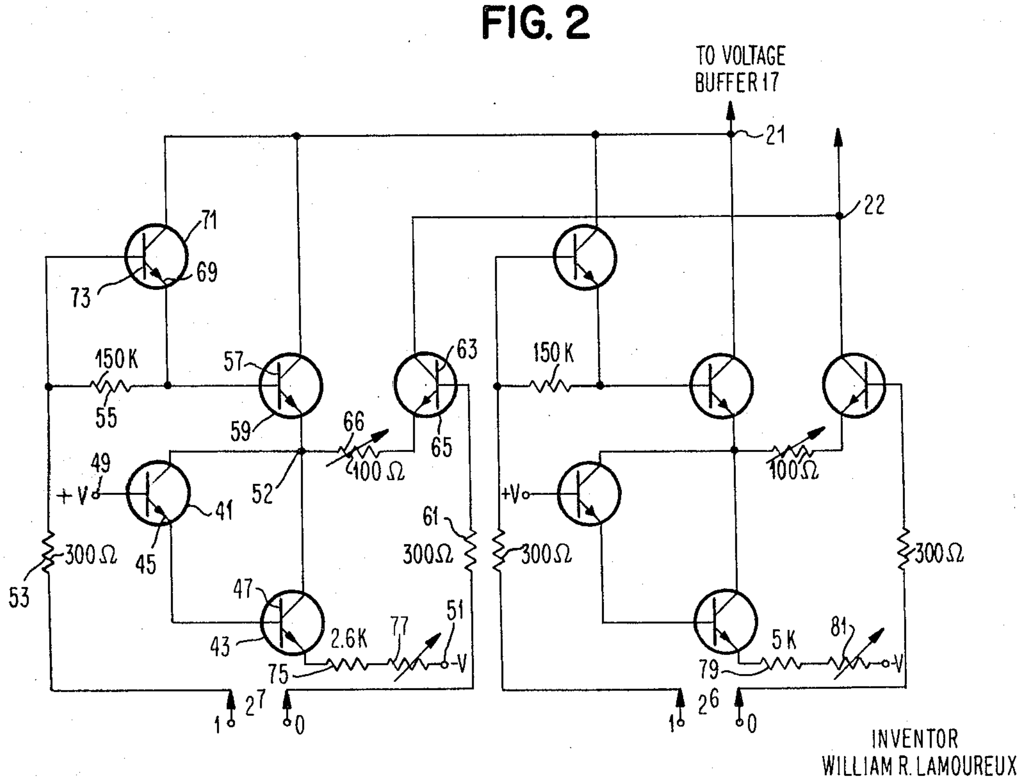
FIGURE 2 illustrates in schematic form a decoding network for a pair of adjacent bits.

Referring now to FIGURE 2, there is illustrated in schematic form details of the digital to analog converters shown in block form in FIGURE 1. For ease of illustration, only two binary stages $2^6$, $2^7$ are shown in detail, but it will be recognized that all stages are substantially identical except for the differences enumerated below relative to weighting of the generated currents. Transistors 41 and 43 are interconnected in a conventional Darlington configuration, the emitter 45 of transistor 41 being connected to the base 47 of transistor 43. As is well-known in the art, a Darlington circuit is an amplifier configuration having a high input impedance and a very high beta. Assuming transistors 41 and 43 have substantially identical beta characteristics, the current output of junction 52 is equal to beta squared. The Darlington configuration is herein employed as a constant current source, and requires that the potential at terminal 49 applied to the base of transistor 41 be maintained positive relative to the potential at terminal 51 by a constant amount. The constant current from the circuit is provided from the common collector output to terminal 52. The binary 1 input from the $2^7$ stage is applied through current limiting resistor 53 and stabilizing resistor 55 to the base 57 of transistor 59, while the binary 0 input from the $2^7$ stage is applied through current limiting resistor 61 to the base 63 of transistor 65. Transistors 59 and 65 function as switching transistors to switch the current at terminal 52 to voltage buffer 17 or 27 in accordance with whether the $2^7$ digital inputs is 1 or 0 respectively, while potentiometer 66 is used to equalize the potential at terminal 52 when either transistor 59 or 65 is on. The emitter 69 of transistor 71 is connected to the base 57 of transistor 59 in another Darlington configuration to provide high gain for the digital 1 input signal applied to the base 73. If the $2^7$ stage digital input is a binary 1, transistor 59 is turned on and the current at terminal 52 is switched through the emitter to collector of transistor 59 to terminal 21, which in turn is connected to voltage buffer 17 (FIGURE 1). If the $2^7$ input is a binary 0, the current at terminal 52 is switched through the emitter-collector junctions of transistor 65 to terminal 22, which in turn is connected to voltage buffer 27. The circuitry associated with the $2^6$ digital input shown in FIGURE 2 as well as the $2^8$ through $2^{11}$ stages not shown is identical to the $2^7$ stage described except that the resistors corresponding to resistors 75, 77 will be binary weighted in accordance with the relative value of the particular digit. For example, if the value of resistors 75, 77 associated with the $2^7$ digit is 2.6K ohms, resistors associated with the $2^8$ decoder, not shown, would be 1.3K ohms and so forth; resistors 79, 81 associated with the $2^6$ input would be 5.2K ohms. The rheostats, such as 77, 81, associated with each input are used to obtain the precise binary weighting. When connected as above-described, the current at terminal 21 will correspond in analog form to the total binary one input applied to converter 13, while the current at terminal 22 will correspond in analog form to the total binary 0 input. Except for the above-noted distinctions, digital analog converter 11 is identical to digital analog converter 13.

Figure 3:
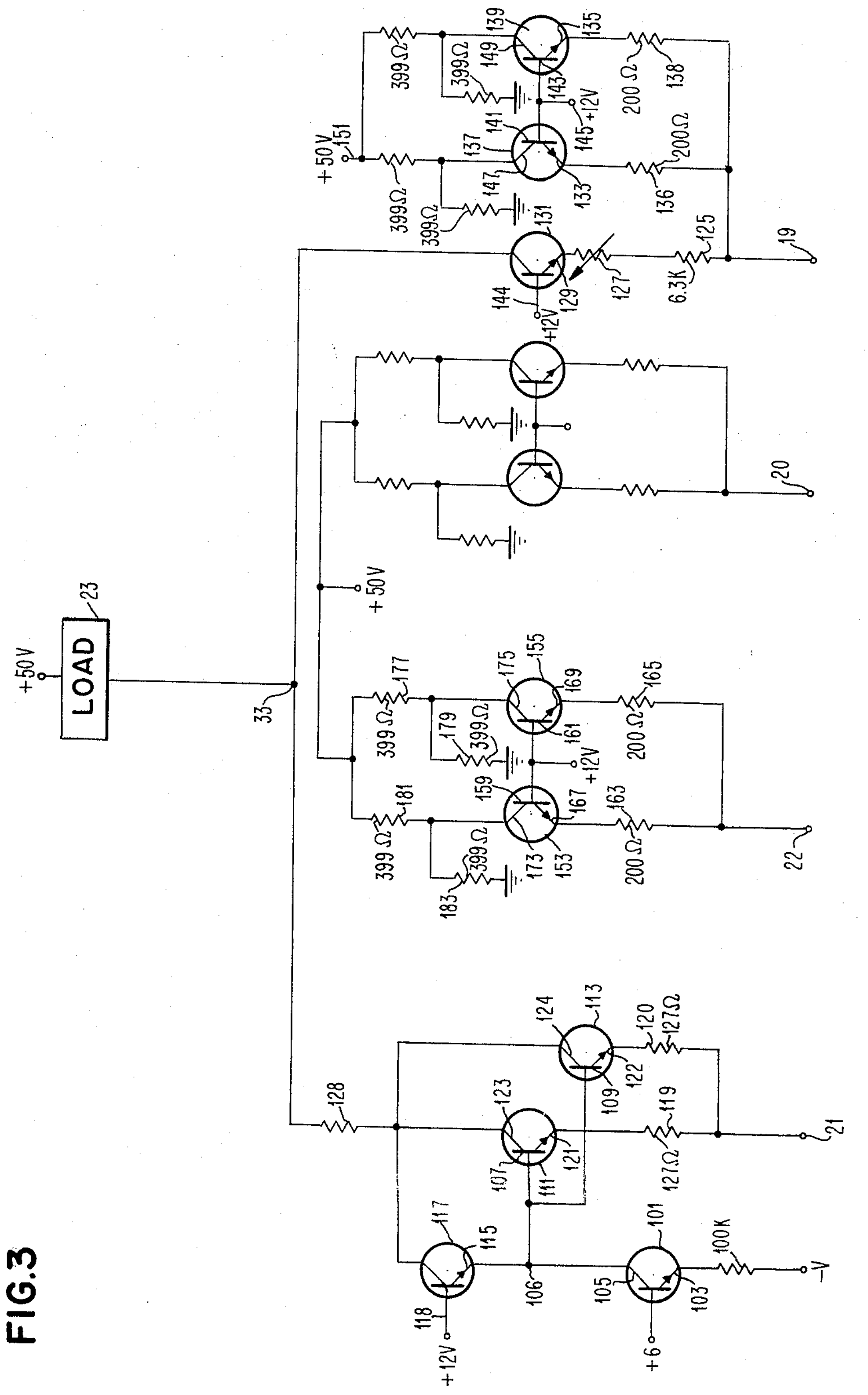
FIGURE 3 illustrates the voltage buffer circuits and terminating networks illustrated in block form in FIGURE 1.

Referring now to FIGURE 3, there is illustrated in schematic form details of the voltage buffers 15, 17, 25, 27 and associated terminating networks 29 and 31 illustrated in block form in FIGURE 1. As previously indicated, the function of the voltage buffers is to prevent any load variation from reflecting back to the decoders, since the decoder output must provide a substantially exact analog representation of the digital input irrespective of load variations. Voltage buffer 15 performs the additional function of reducing the output from decoder 11 to one sixty-fourth of its value before being applied to the load. Transistor 101 having its emitter 103 connected to a source of negative potential and its base connected to a source of positive potential comprises a constant current source, the output of which is applied from collector 105 to bases 107 and 109 of transistors 111 and 113 respectively. The emitter 115 of transistor 117 is connected to the bases 107, 109 of parallel connected transistors 111 and 113 in a modified Darlington configuration. Transistor 117 is turned on by a positive level applied to its base through conductor 118. The current at terminal 106 from transistor 101 biases transistor 117 provided that a positive potential at terminal 118 is applied to the base. The output from decoder 13 at terminal 21 is applied through resistors 119, 120 to emitters 121, 122 of transistors 111, 113, the resultant output at collectors 123, 124 of which are applied through terminal 126 and resistor 128 and summing node terminal 33 to load 23. Connected in this manner, it is evident that any potential variation in the load will have no effect on the current output from the collectors of transistors 111 and 113, which provide the analog representation of the corresponding binary 1 input.

Referring now to FIGURE 3 for the details of voltage buffer 15, the output from decoder 11 (FIGURE 1) is applied via terminal 19 through resistor 125 and rheostat 127 to the emitter 129 of transistor 131. The input is also applied to the emitters 133 and 135 of parallel connected transistors 137 and 139 through resistors 136 and 138 respectively. The bases 141 and 143 are connected to common source of positive potential 145, while the collectors 147, 149 of transistors 137, 139 are connected to common output source 151. The base 144 of transistor 129 is also connected to a positive potential source. As previously indicated, the analog output from decoder 11 must be reduced by a factor of sixty-four. Current division is accomplished in the following manner. It will be noted that the values of parallel resistors 136 and 138 is 200 ohms, or a net resistance of 100 ohms, while the value of resistor 125 is 6.3K or 6300 ohms. In accordance with Ohm's law, since all three transistors are normally biased on as above-described, one sixty-fourth of the current will flow through resistor 125 and transistor 131 to summing node 33, while the remaining $^{63}/_{64}$ of the current will be dissipated in the terminating network including resistors 136, 138; transistors 137, 139 and associated circuitry. Thus effectively, the current output from decoder 11, when reduced in voltage buffer 15 to one sixty-fourth the decoder output, corresponds to the analog value of the lower order byte. In like manner, current division of any additional bytes in a larger word could be accomplished by similar current dividing technique to provide the relative value of the byte to the common output.

The voltage buffers 27, 25 and terminating networks 31, 29 (FIGURE 1) are shown in detail in FIGURE 3. Since both networks are identical a description of voltage buffer 27 will suffice for an understanding of both. As previously noted, the function of each buffer and associated network is to dissipate the binary 0 output from the associated decoder and prevent any reflection back to the source. Obviously, in a single-sided decoding network, a terminating network would not be required. Parallel connected transistors 153, 155, biased on by a positive potential applied from terminal 157 to bases 159, 161, are utilized for power dissipation purpose. The signal from terminal 22, representing the summation of the binary 0 output from digital analog decoder 13, is applied through resistors 163, 165 to emitters 167, 169 of transistors 153, 155 respectively. Collectors 173, 175 are connected to terminating network 31 (FIGURE 1) which in the preferred embodiment comprise resistors 177, 179 and 181, 183 respectively. Since the binary 0 output is not utilized in the preferred embodiment, no byte weighting or current division is required. Voltage buffer 25 and terminating network 29 connected to output terminal 20 of decoder 11 are identical to those above-described. Obviously, should a weighted current of the binary 0 output be required, it could be accomplished in substantially the same manner as shown and described relative to voltage buffer 15.

While the subject invention has been shown and described in a binary environment, it is equally applicable to binary coded decimal notation. Likewise, as heretofore noted, the invention is applicable to single- or double-ended binary inputs. Where the size of the word is not susceptible to an even number of bytes, such as a 40-bit word using 6-bit bytes, the word would be broken into six 6-bit bytes starting at the high order and the remaining 4-bit byte handles independently but in the same manner. Alternatively bytes of different size could be used in the same word by appropriate selection of resistors within the voltage buffer dividers.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A digital to analog decoder for converting a digital word to a corresponding analog signal on a byte basis, each of said bytes consisting of a group of adjacent bits in said digital word, comprising in combination, a plurality of decoding networks for decoding associated one of said bytes and generating analog signals indicative thereof irrespective of the relative significance of said bytes within said digital word, means responsive to said analog signals from said decoding networks for weighting each of said analog signals in accordance with the relative significance of each of said bytes in said digital word, and means responsive to said byte weighted analog signals for providing said analog representation of said binary coded digital word.

2. A device of the character claimed in claim 1 wherein said decoding networks are substantially identical and adapted to provide identical analog outputs for corresponding input permutations.

3. A digital to analog decoder for converting a digital word into an equivalent analog signal on a byte basis, each byte consisting of a group of adjacent bits in said word, comprising in combination, a plurality of substantially identical decoding networks, means connecting said digital bytes to their associated decoding networks, said decoding networks being related to provide substantially identical analog outputs for corresponding digital byte permutations, said decoding networks including means for generating analog signals corresponding to the digital value of their associated bytes irrespective of the relative significance of the bytes within said digital word, means for assigning a predetermined relative weighting for each of said analog signals in accordance with the relative significance of its associated byte in said digital word, and means for combining said byte weighted analog signals to provide the analog equivalent of said digital word.

4. A device of the character claimed in claim 3 wherein each of said decoding networks include means to provide a relative weighting for each digit in said byte.

5. A device of the character claimed in claim 3 wherein said means for assigning a predetermined relative weighting for each of said analog signals comprises a voltage divider network connected to the outputs of said decoding networks.

6. A device of the character claimed in claim 3 wherein said means for assigning a predetermined relative weighting for each of said analog signals includes means for preventing any load variations from reflecting back to the associated decoding network.

7. A device of the character claimed in claim 6, wherein said means for preventing load reflections comprises a voltage buffer for each of said decoding networks adapted to provide unidirectional current flow and maintain a constant potential at the output of said network corresponding to the digital value applied thereto irrespective of load fluctuation.

8. A device of the character claimed in claim 3 wherein said decoding networks are double ended for accommodating a pair of significant inputs representing binary 1 and 0 conditions for each of said bits.

9. A digital to analog converter for decoding a multiple bit digital message comprising in combination, a plurality of digital to analog decoders, each of said decoders decoding a byte comprising a plurality of adjacent bits in said message to provide analog representations of the binary value of the digital byte, each digital input having binary one and zero representations, said decoders including individual bit decoding circuits for each of said digital inputs, a plurality of voltage buffer circuits each connected to the output of said decoders, means for selectively switching the decoded analog value of said digital bytes to said voltage buffer circuits in accordance with the binary value of the associated byte, a plurality of terminating networks connected to said voltage buffer outputs associated with the decoded binary zero analog representations, means for weighting the output from each of said decoders in accordance with the relative significance of the associated byte in said digital message, means for summing the weighted outputs from said voltage buffers representing the decoded binary one values and means for applying said summed output representing the analog value of said digital message to a load.

References Cited by the Examiner

UNITED STATES PATENTS

| | | | |
|---|---|---|---|
| 2,731,631 | 1/1956 | Spaulding | 340—347 |
| 2,946,044 | 7/1960 | Bolgiano et al. | 340—347 |

MAYNARD R. WILBUR, *Primary Examiner.*

DARYL W. COOK, ROBERT C. BAILEY, *Examiners.*

W. J. KOPACZ, *Assistant Examiner.*